June 9, 1931.  G. V. RODRIGUEZ  1,808,995
LOADING APPARATUS
Filed June 8, 1926   3 Sheets-Sheet 1
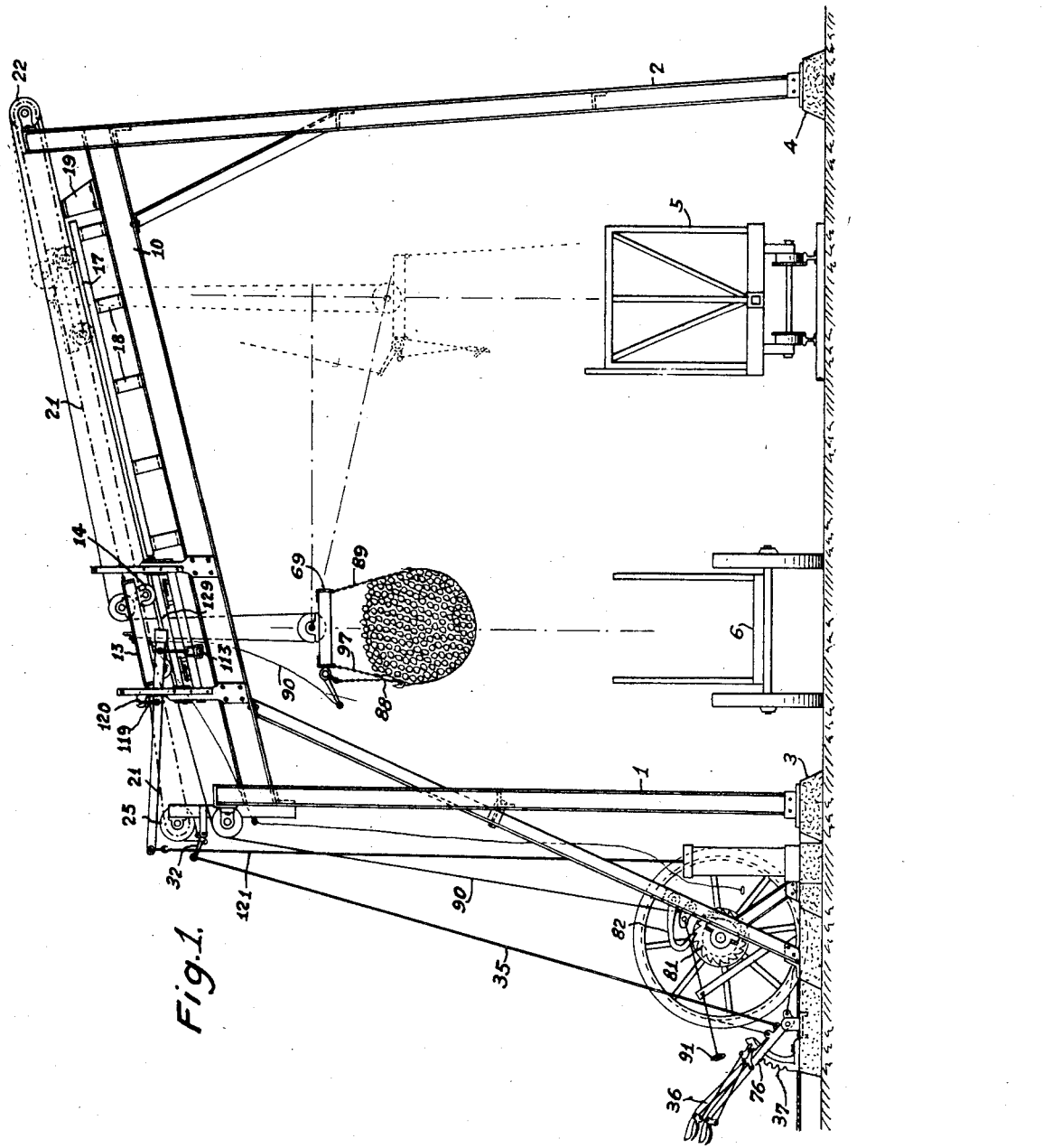
INVENTOR.
G. V. RODRIGUEZ,
BY
ATTORNEY.

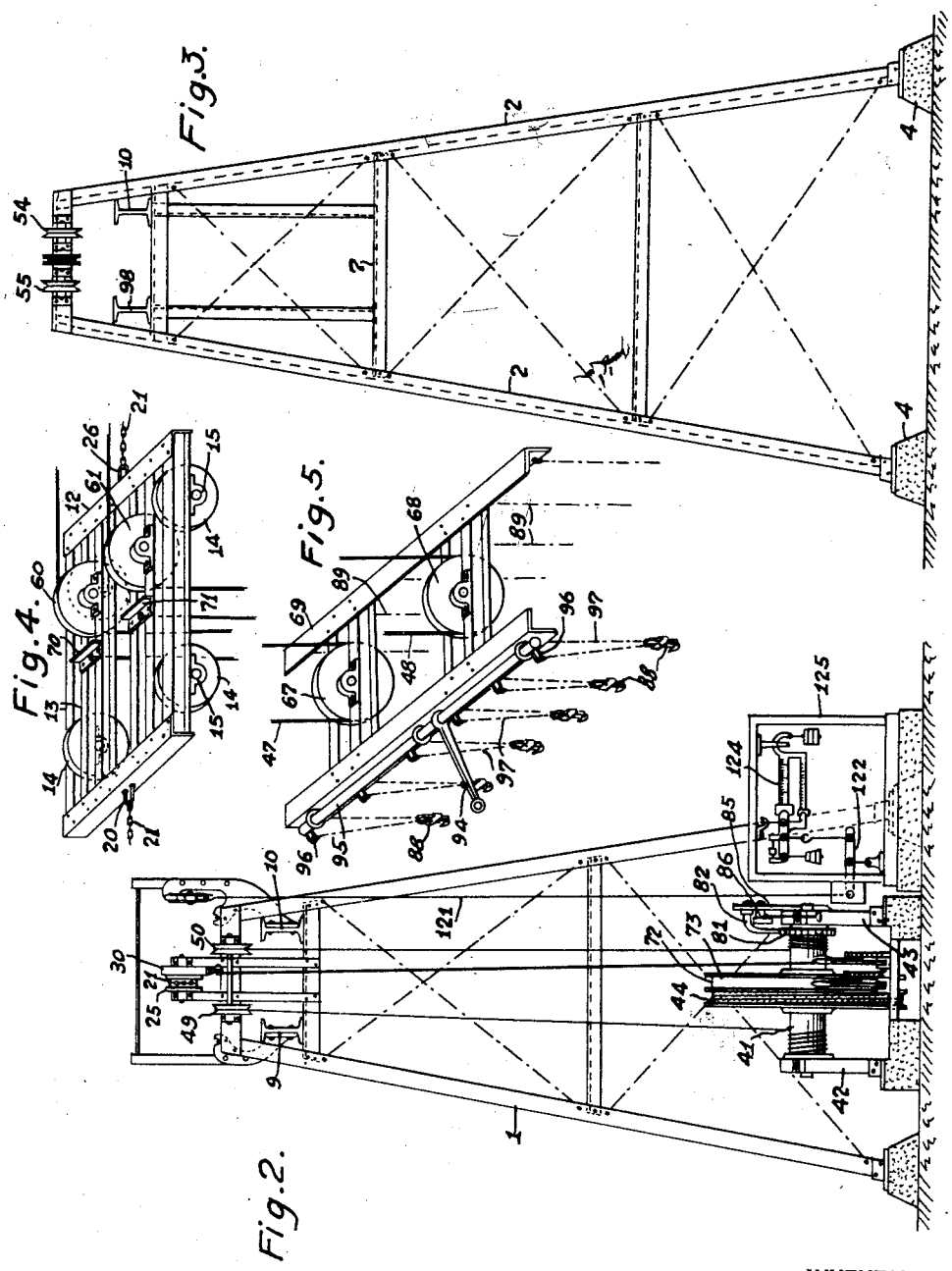

June 9, 1931. G. V. RODRIGUEZ 1,808,995
LOADING APPARATUS
Filed June 8, 1926 3 Sheets-Sheet 3
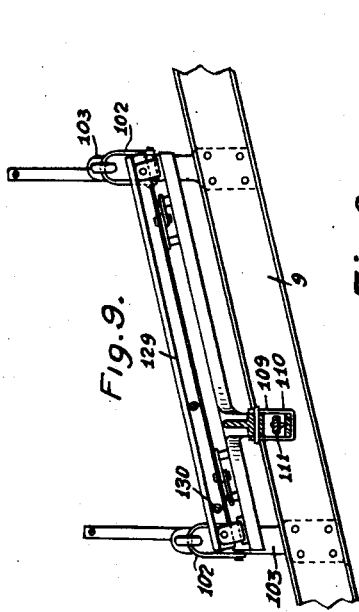
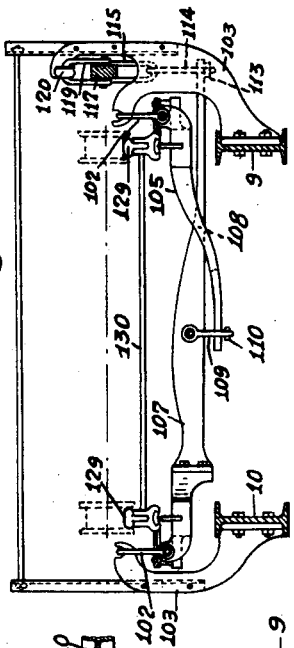
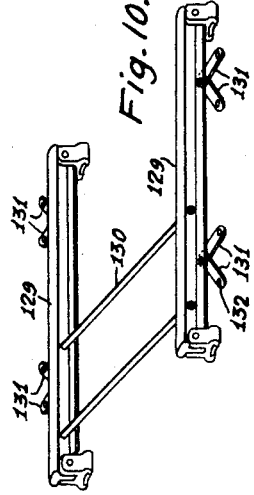
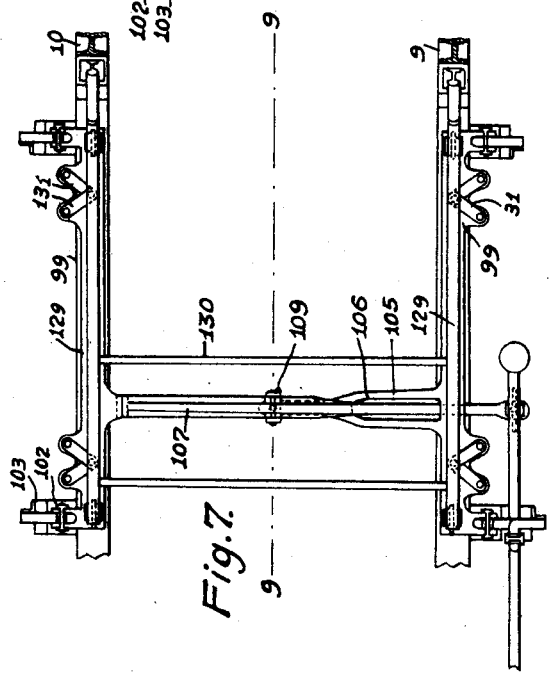
INVENTOR.
G. V. RODRIGUEZ,
BY
ATTORNEY.

Patented June 9, 1931

1,808,995

UNITED STATES PATENT OFFICE

GERMAN VIERA RODRIGUEZ, OF MANZANILLO, CUBA

LOADING APPARATUS

Application filed June 8, 1926. Serial No. 114,494.

This invention is directed to an improvement in loading apparatus combined with weighing mechanism, being particularly designed for the transfer of loads of sugar cane or the like from the carts or vehicles in which it has been transported from the fields to the railroad or like cars for shipment, the weight of a particular load being indicated as it is elevated from the cart.

The main object of the present invention is the provision of a loading mechanism in the form of an elevated structure adapted to overlie an area in which the carts to be unloaded may be placed and also a suitable length of trackage on which the cars to be loaded may be stationed, with the carrier supported from a track traveling carriage supported on a frame and movable from a position above the cart to a position above the car, the track on which the carriage travels being in part movable under the load to reach the weight thereof and being arranged in an upward inclination toward the point of delivery to thereby permit the carriage and carrier to return to normal or loading position automatically.

A further object is the utilization of the weight of material for automatically transferring the load from the cart to the car, whereby the use of auxiliary power is eliminated except that required for raising of the load.

The invention in the preferred form is illustrated in the accompanying drawings:

Fig. 1 is a side elevation of the improved loading and weighing apparatus.
Fig. 2 is a front elevation of the same.
Fig. 3 is a front elevation of the frame.
Fig. 4 is a perspective view of the carriage.
Fig. 5 is a perspective view of the carrier.
Fig. 6 is a broken side elevation illustrating more particularly the weighing mechanism.
Fig. 7 is a plan of the same.
Fig. 8 is an end elevation of the same.
Fig. 9 is a section on line 9—9 of Fig. 7.
Fig. 10 is a perspective of the removable track section of the weighing apparatus.

The improved apparatus comprises a frame structure including uprights 1 and 2, resting on bases 3 and 4, and a superstructure made up of a frame including cross bars 7 and 8 between the uprights 1 at one end and the uprights 2 at the opposite end and longitudinally extending beams 9 and 10.

The frame structure thus provided is suitably braced in the space between the uprights 1 at one end and the uprights 2 at the opposite end, is sufficient to accommodate therebetween a road bed or surface on which the carts 6 to be unloaded may be positioned and also a track on which the cars 5 to be loaded may be positioned, with both underlying the longitudinally ranging beams 9 and 10.

A trackway which includes a movable or weighing section hereinafter referred to, is made up of rails 17, supported above the beams 9 and 10 by cross beams 18. The fixed trackway portion is provided at one end with a stop or bumper 19, supported upon the beams 9 and 10, and limiting movement of the car in that direction to prevent it leaving the trackway.

The car comprises a frame structure of skeleton form made up of end beams 11 and 12, and longitudinally ranging tie beams 13. The car is supported for travel on the trackway through the medium of track traveling rollers 14 mounted at appropriate points on the beams 13 and supported in bearing hangers 15. It is to be noted that the longitudinal beams 9 and 10 of the main frame incline upwardly from the point at which the load is picked up toward the point where the load is delivered, the trackway 17 being of course similarly inclined. The car is operated from a point preferably at one end of the main frame at the base portion thereof, the operating mechanism including a cable 21, having its terminals connected at the respective ends of the car, that is, to the beam 11 at 20 and to the beam 12 at 26, this cable passing around sheaves 22 and 25 supported at the respective ends of the main frame, as more clearly shown in Fig. 1. The shaft or axle of sheave 25 is provided with a brake drum 30, having a brake band 31, the ends of which are connected by lever 32 and said lever is in turn operated through a rod 35 connected to a lever 36 arranged at the operator's position at the base of the main frame and having the usual locking dog and segment 37, whereby through obvious control of the brake, the carriage may be stopped and held at any point or permitted to move freely as may be desired.

A load carrier is supported by and movable with the carriage, such carrier comprising transverse beams 69, with intermediate tie bars to provide a rigid structure which may depend below the carriage for the support of the load. The carrier is provided with a plurality of load gripping elements adapted to encircle the load to be lifted for supporting such load directly from the carrier. These elements comprise a series of chains 89 pendent from one of the transverse beams 69 of any appropriate length, and cooperating chains 97 of shorter length pendent from the other beam. The chains 97 are provided with terminals in the form of composite hooks 88, with which any link of the companion chain 89 may be connected after such chain 89 has been passed about the load, as shown in Fig. 1. The composite hooks are adapted to be opened to release the connected chain 89 at the will of the operator, the movable part of each hook being connected to an offset or radial projection 96 from a shaft 95 mounted for rocking movement relative to one of the beams 69, with the said shaft provided with an operating extension 94 connected through a cable 90 passing over a guiding sheave on the car, and a guiding sheave on the main frame and extending to and terminating in a handle 91, adjacent the operator's position. Thus the operator may, at will, release the load, as for example when it has been moved to a position above the car 5, and permitted to fall into the car.

It is of course understood that the carrier as a whole is lowered to a position immediately above the cart from which the load is to be taken, and after the load has been connected to the carrier by the chain 69, said carrier is elevated to a position above obstruction or closely adjacent the car, whereupon the latter with the carrier and load is moved longitudinally of the trackway 17 to a position above the car 5, the carrier being then lowered to a point immediately above the car and the load released in the manner described. The carrier is provided with means whereby it may be elevated and lowered relative to the car and this carrier operating means is also utilized to compel a traveling movement of the car toward the point of delivery, it being understood that as shown in the drawings, the longitudinal beams 9 and 10 of the main frame incline upwardly toward the point of delivery, so that after the delivery of the load, the car will travel down the incline with the carrier to the loading point above the cart. The operating means for the carrier and car comprises cables 47 and 48 which are each terminally connected at 70 and 71 to the car, then pass downwardly and around pulleys 67 and 68 on the carrier, then upwardly and over pulleys 60 and 61 on the car, then forwardly of the main frame to and around pulleys 54 and 55 at the end of the main frame, then return beneath the car at the opposite end of the main frame passing over pulleys 49 and 50, and then extend downwardly to the operator's position, being at such point wound upon a drum 41, supported in bearings 42 and 43. The drum is operated by means of a motor of any appropriate type operating through an enlarged drive wheel 44 fixed on the drum, a brake drum 73 being also secured upon the operating drum 41 and provided with a brake band 72 operated in the usual manner by a lever 76, whereby the drum 41 may be held against movement at will. The drum 41 is also provided with a ratchet 81 arranged for the cooperation therewith of a pawl 82 pivoted upon one of the brace bars of the main frame and acting when in cooperation with the ratchet to prevent unwinding movement of the cables 47 and 48. The pawl 82 is controlled by a cam 86 underlying the pawl and operated by a rod 85, obviously permitting the pawl to engage the ratchet or holding the pawl out of engagement with the ratchet in accordance with the position of the cam.

In connection with the load transferring mechanism described, the improvement contemplates the provision of weighing mechanism whereby the load, as soon as it is lifted free of the cart from which it is taken, is automatically weighed. The weighing mechanism proper is illustrated more particularly in Figs. 6 to 10 inclusive, and includes a movable track section made up of rails 129, connected by tie bars 130 and supported in alignment with the fixed trackway 17 by plates 131 formed with openings 132 to cooperate with projections 133 rising from plates 99 extending longitudinally of the main frame and beneath the movable trackway. The plates 99 are supported by stirrups 102 from arms 103 which are secured at their lower ends to the longitudinal beams 9 and 10 at points substantially in line with the respective ends of the movable trackway. An arm 107 is connected to one of the plates 99 and extends transversely of the movable trackway, being projected through an opening 106 in a curved arm 105, which extends from the opposite plate 99. The arm 105 is curved and extends beneath the arm 107 and has a knife edge bearing through a projection 111 in a block 110 carried by a stirrup 109 pendent from the arm 107 at the point 108. The arm 107 is extended beyond the arm 105 and is terminally provided with a point projection 112 having appropriate bearing in a block 113 carried by a stirrup 114 freely pendent from a U-link 115 supported by one end of a weighing beam 117, the beam being supported intermediate its ends by a stirrup 119 from a fulcrum 120 provided as an extension of one of the arms 103. The free end of the beam 117, that is, the end remote from the end connected to the arm 107, is connected by a rod 121 to a balance lever 122, which in turn is connected to an ordinary scale mechanism 124 arranged in a housing 125 convenient to the operator's position. The weighing mechanism proper, that shown at 124, is unimportant so long as it is responsive in the usual manner to the weight movement imposed thereon through the operation of the balance lever 122. From the above description, it will be apparent that the operator, after the load from the cart has been encircled by the chains of the carrier, may operate the drum 41 and thereby elevate the carrier to lift the load. As soon as the load is lifted free of the cart, the movable section of the trackway, on which the car is now resting, will respond to the load, and through the actuation of the arms 105 and 107, operate the scale beam 117 and thereby indicate on the scale 124 the weight of the load. With the weight of the carrier and parts previously determined, the actual weight of material is readily ascertained. The drum may then be further operated to raise the carrier to a point where the weight of the load balances the pull necessary to move the car, following which the car and carrier will move to the discharge position above the receiving car 5, whereupon the carrier may be lowered by permitting the drum 41 to operate reversely under the control of the brake band 72 until the carrier has been moved to a position somewhat close to the receiving car 5. The cable 90 is then operated to release the connected ends of the chains 89, whereupon the load is free to fall into the receiving car. During this operation of the release of the load, the pawl 82 is in cooperation with the ratchet to prevent movement of the drum 41 and thereby of the carrier. After discharge of the load, the car and suspended carrier will gravitate toward the receiving end which is the weighing section of the track, this movement of the car being controlled by the brake band 31.

Claims:

1. A weighing apparatus including a movable track section, plates carried by said movable track section, stirrups connected to said plates and supported from a fixture, a long arm connected to one of said plates and extending transversely of and beneath the track section and to a point beyond the opposite side of the track section, a short arm connected to the other of said plates and extending transversely of the track section to a point substantially in the longitudinal median line thereof, a swinging knife edge support carried by the long arm to provide a knife edge bearing for the free end of the short arm, and weight indicator operating mechanism connected to the free end of the long arm.

2. A weighing apparatus including a movable track section, plates carried by said movable track section, stirrups connected to said plates and supported from a fixture, a long arm connected to one of said plates and extending transversely of and beneath the track section and to a point beyond the opposite side of the track section, a short arm connected to the other of said plates and extending transversely of the track section to a point substantially in the longitudinal median line thereof, a swinging knife edge support carried by the long arm to provide a knife edge bearing for the free end of the short arm, a weighing beam connected to a scale mechanism, a stirrup depending from the weighing beam, and a point bearing carried by the stirrup to receive the free end of the long arm.

3. A weighing apparatus including a movable track section, means for movably connecting said section to a fixture, arms movably connected to said means, said arms extending in opposite directions and one of the arms being longer than the other, a bearing for the free end of the short arm and carried by an intermediate portion of the long arm, the free end of the long arm being projected beyond the approximate end of the short arm, and means connected to the projected end of the long arm and controlling the operation of a weight indicating device.

4. A weighing apparatus for use in connection with a loading apparatus having a track and a track traveling carrier, said weighing apparatus including movable track sections for the carrier, supports for the track sections having swinging connection with the fixture, said supports including arms underlying the track sections and projecting toward each other, one of the arms being of greater length than the other, a bearing carried by the long arm intermediate the track sections to support the free end of the short arm, the short arm being formed with an elongated opening through which the free end of the long arm is extended and in which it is arranged for relative movement, the free end of the long arm being extended beyond the track section, a weighing device controlling lever supported for swinging movement beyond the track section, and a connection between the free end of the long arm and said lever.

In testimony whereof I have signed my name to this specification.

GERMAN VIERA RODRIGUEZ.